(12) United States Patent
Kino et al.

(10) Patent No.: US 6,231,907 B1
(45) Date of Patent: *May 15, 2001

(54) METHOD FOR PRODUCING HIGH-QUALITY DRINKS FILLED IN CONTAINERS

(75) Inventors: Takuya Kino; Michio Manabe; Yoshinobu Hayakawa; Masayoshi Hagiwara, all of Aichi-ken (JP)

(73) Assignee: Pokka Corporation, Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/681,481

(22) Filed: Jul. 23, 1996

(30) Foreign Application Priority Data

Mar. 26, 1996 (JP) .................................... 8-094731
Mar. 26, 1996 (JP) .................................... 8-124125

(51) Int. Cl.[7] ................................ A23F 3/18; A23F 5/26; B65B 31/02; B65D 81/20
(52) U.S. Cl. ................ 426/131; 426/397; 426/392; 426/404; 426/433; 426/435; 426/594; 426/597; 53/432
(58) Field of Search .................... 426/397, 418, 426/392, 316, 399, 400, 401, 131, 433, 435, 404, 486, 487, 594, 597; 53/432

(56) References Cited

U.S. PATENT DOCUMENTS

| | | | |
|---|---|---|---|
| 1,361,498 | * 12/1920 | Ruff | 426/397 |
| 2,131,181 | * 9/1938 | Kantor | 426/397 |
| 2,240,655 | * 5/1941 | Kronqvest . | |
| 2,325,360 | * 7/1943 | Ayers et al. | 426/399 |
| 2,327,732 | * 8/1943 | Mekinnis | 426/399 |
| 2,333,898 | * 11/1943 | Stevenson et al. | 426/397 |
| 2,433,071 | * 12/1947 | Stevenson | 426/397 |
| 2,517,569 | * 8/1950 | Huzenlaub | 426/399 |
| 2,649,671 | * 8/1953 | Bartelt | 53/433 |
| 2,759,307 | * 8/1956 | Edlkin | 426/397 |
| 2,911,308 | * 11/1959 | Smith et al. | 426/397 |
| 3,039,882 | * 6/1962 | Clinton et al. | 426/418 |
| 3,266,905 | * 8/1966 | Baker et al. | 426/397 |

(List continued on next page.)

FOREIGN PATENT DOCUMENTS

| | | | |
|---|---|---|---|
| 575517 | * 5/1959 | (CA) | 426/410 |
| 2089191 | * 6/1982 | (GB) | 426/397 |
| 51-57863 | 5/1976 | (JP) . | |
| 56-039134 | 4/1981 | (JP) . | |
| 63-152944 | * 6/1988 | (JP) | 426/397 |
| 1-206976 | 8/1989 | (JP) . | |
| 4-40853 | * 2/1992 | (JP) | 426/316 |
| 4-281773 | 10/1992 | (JP) . | |
| 4-320670 | 11/1992 | (JP) . | |
| 6-141776 | 5/1994 | (JP) . | |

*Primary Examiner*—Steven Weinstein
(74) *Attorney, Agent, or Firm*—Browdy and Neimark

(57) ABSTRACT

The present invention relates to a method for producing high-quality drinks filled in containers, which is characterized in that containers are made to have a nitrogen gas atmosphere to be in a substantially deoxidated condition prior to being filled with drinks. According to the method of the present invention, the inside of empty containers is made in a substantially oxygen-free condition, and drinks as prepared in the presence of an inert gas or in a deoxidated condition are filled into the containers. Therefore, all steps constituting the method, including the step of preparing raw materials through the step of filling and sealing drinks in containers, can be conducted all the way in a deoxidated condition to give high-quality drinks filled in containers.

10 Claims, 1 Drawing Sheet

U.S. PATENT DOCUMENTS

| | | | |
|---|---|---|---|
| 3,531,299 | * | 9/1970 | Benjamins .......................... 426/397 |
| 3,821,448 | * | 6/1974 | Parker et al. ....................... 426/397 |
| 3,875,318 | * | 4/1975 | Davies ................................ 426/397 |
| 3,877,197 | * | 4/1975 | Cayton et al. ...................... 426/410 |
| 4,060,956 | * | 12/1977 | Goble ................................. 426/397 |
| 4,140,159 | * | 2/1979 | Domke . |
| 4,152,464 | * | 5/1979 | Brody et al. ........................ 426/399 |
| 4,325,296 | * | 4/1982 | Ukai et al. .......................... 426/418 |
| 4,347,695 | * | 9/1982 | Zobel .................................. 426/397 |
| 4,391,080 | * | 7/1983 | Brody et al. ........................ 426/399 |
| 4,409,775 | * | 10/1983 | Brody et al. ........................ 426/399 |
| 4,703,609 | * | 11/1987 | Yoshida et al. ..................... 426/397 |
| 5,085,035 | * | 2/1992 | Marano et al. ...................... 53/432 |
| 5,384,143 | * | 1/1995 | Koyama et al. .................... 426/397 |
| 5,417,255 | * | 5/1995 | Sanfilippo et al. .................. 53/432 |
| 5,532,011 | * | 7/1996 | Goglio ................................ 426/397 |

* cited by examiner

METHOD FOR PRODUCING HIGH-QUALITY DRINKS FILLED IN CONTAINERS

DETAILED DESCRIPTION OF THE INVENTION

Field of the Invention

The present invention relates to a method for producing high-quality drinks (including liquid and fluid foods) filled in containers, in which the drinks are kept good to have their original taste, flavor and quality for a long period of time.

The present invention has resulted in the success in the employment of drastic antioxidation, which, however, no one could attain in the prior art. The drinks as filled into containers according to the present invention are kept good to have their original fresh taste, flavor, feel in the mouth and quality for a long period of time.

For example, the present invention relates to the production of high-quality coffee filled in containers, in which coffee that is easily oxidized is kept good to have its original taste, flavor and quality for a long period of time.

The present invention was the first to succeed in the employment of drastic antioxidation, which, however, no one could attain in the prior art. Coffee as filled into containers according to the present invention is kept good to have its original fresh taste, flavor and quality for a long period of time.

Prior Art

Various methods have heretofore been carried out and proposed for antioxidation of drinks. One of them is a hot filling method in which drinks are filled into containers and hermetically sealed therein, while hot at from 80 to 100° C., under ordinary pressure whereby the drinks are kept sterilized therein and the amount of oxygen in the head space in each container is reduced.

However, the reduction in the oxygen amount according to the hot filling method is limitative, and therefore the method is disadvantageous in that the deterioration of the drinks filled is inevitable due to the oxidation thereof during and after the filling.

For coffee, for example, a method of conducting all the steps of brewing, extraction, filtration, filling and sealing of coffee under inert gas pressure has been proposed (Publication of Japanese Patent Application, JP-A 51-57863) This method is good. However, the recent consumers' needs for high-quality and real-taste coffee filled in containers are great, and the products obtained by the method could not meet the needs.

Other drinks filled in containers are also problematic in that their quality is lowered, their original flavors are lost, useful components such as vitamins, etc. in them are deteriorated and/or reduced, their colors and aromas are worsened and their feel in the mouth is changed or worsened, after having been stored for a long period of time. In addition, too much oxidation of the drinks filled in containers results in the oxidation of the fats to be in the drinks thereby producing carcinogenic substances which are harmful to the health.

Problems to be Solved by the Invention

The recent consumers' needs for high-quality, real-taste and healthy products are great, which shall apply even to drinks filled in containers to be drunk in a certain period of time after their production. The present invention is to meet the needs, providing a method for producing high-quality drinks filled in containers which shall have their original fresh taste, flavor, feel in the mouth, outward appearance and ingredients like those just having been brewed, extracted, squeezed and produced.

Even for coffee, for example, as filled in containers to be drunk in a certain period of time after having been brewed and extracted, consumers greatly desire to have high-quality coffee having its original fresh taste and flavor like that just having been brewed and extracted. The present invention is to meet the consumers' needs.

The costs for producing such high-quality drinks filled in containers can be reduced since the determined term within which the drinks are safely and deliciously drinkable can be prolonged. Therefore, high-quality drinks filled in containers meet the manufacturers' demand for industrial rationalization in producing them. The present invention is to satisfy both the consumers' needs and the manufacturers' needs.

Means for Solving the Problems

The present invention has attained the above-mentioned object. We, the present inventors have again specifically noted the importance of antioxidation in the maintenance of the quality of drinks filled in containers and have investigated various related matters. As a result, we have unexpectedly found that, when nitrogen gas is previously introduced into empty containers, prior to filling them with drinks, to thereby minimize as much as possible the amount of oxygen remaining in the containers and thereafter the containers are filled with drinks, then degassed and sealed, the drinks filled in the containers can maintain their original fresh taste. According to this method, therefore, it is possible to obtain high-quality drinks filled in containers.

On the basis of this valuable finding, we have further studied and, as a result, have completed the present invention.

Specifically, the fundamental technical idea of the present invention is such that the inside of empty containers is made to have a nitrogen gas atmosphere thereby to be in a substantially deoxidated condition, prior to being filled with drinks, on the basis of which high-quality drinks filled in containers while being prevented from being oxidized and deteriorated are industrially produced according to the present invention.

The present invention is described in detail hereinunder.

Embodiments of Carrying out the Invention

Figure 1:
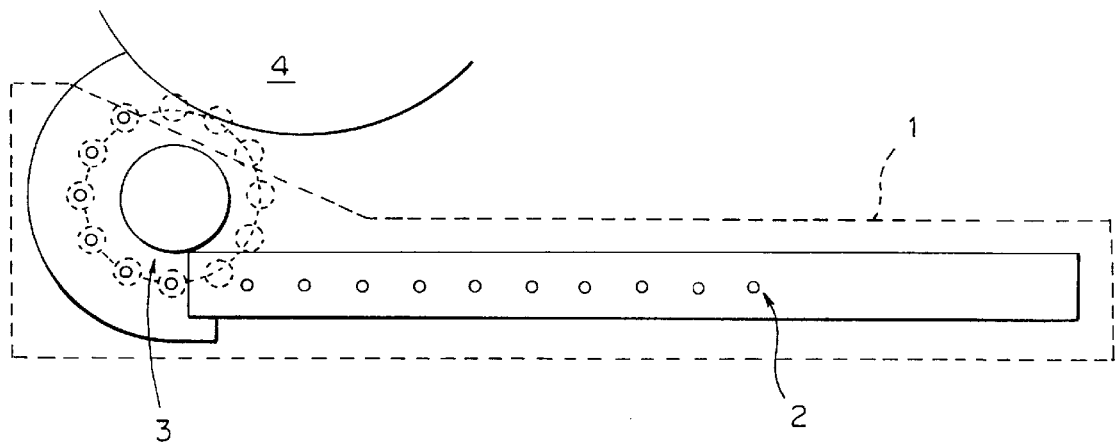
FIG. 1 is a plan view showing an apparatus to be used in the present invention.

To produce high-quality drinks filled in containers according to the present invention, it is indispensable that the inside of empty containers is in a deoxidated condition and thereafter the containers are filled with drinks, as so mentioned hereinabove. Any known antioxidation techniques may apply to the other treatments.

For example, the drinks themselves to be filled into containers are fully deoxidated, all the steps of extracting, squeezing, seasoning, processing and filtering the drinks, filling them into containers and sealing the thus-filled containers are conducted under inert gas pressure, deoxidated raw materials are used, the head space of the tanks for storing raw materials therein is substituted with an inert gas, and other various antioxidation treatments can be suitably employed.

For coffee, for example, all the steps of brewing coffee powder, filtering the extract, filling it into containers and sealing the thus-filled containers are conducted under inert gas pressure, deoxidated raw materials are used, the head space of the tanks for storing raw materials therein is substituted with an inert gas, and other various antioxidation treatments can be suitably employed.

In the present invention, the inside of empty containers must be substantially deoxidated before they are filled with drinks.

For this, for example, empty containers are once evacuated and thereafter filled with nitrogen gas, or they are first filled with water and then with nitrogen gas, or water as filled in them is substituted with nitrogen gas. If desired, these operations are repeated or combined. Thus, the inside of the empty containers is made to have an inert gas atmosphere substantially free from oxygen.

To deoxidate the inside of containers, for example, employable is a deoxidating apparatus as shown in the drawings, apart from the above-mentioned means.

Figure 2:
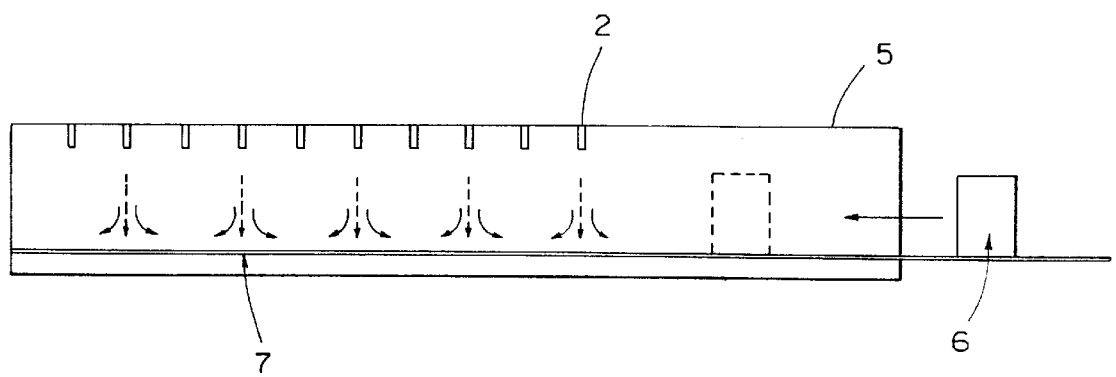
FIG. 2 is a sectional view of the apparatus of FIG. 1.

FIG. 1 is a plan view of the apparatus, and FIG. 2 is a sectional view thereof. In the drawings, the numeral references are as follows: 1 is a tunnel, 2 is a nitrogen gas nozzle, 3 is a star wheel, 4 is a filler, 5 is a tunnel, 6 is a container, and 7 is a belt conveyer.

Empty containers 6 (cans are shown herein) are put onto the belt conveyer 7 and led into the tunnel 1 (5) having a nitrogen gas atmosphere, and then nitrogen gas is jetted into the inside of the containers 6 through the nitrogen gas nozzles 2 to remove the remaining oxygen from the containers 6, which are thus forcedly filled with nitrogen gas. Accordingly, the inside of the containers is deoxidated.

The nitrogen gas nozzles are shown to be relatively short, but their length can be suitably changed. If long nozzles capable of reaching the bottom of containers are used, the deoxidation can be effected more efficiently.

The flow rate of nitrogen gas to be jetted into empty containers may be from 0.01 to 5 N m$^3$/min., preferably from 0.05 to 1.5 N m$^3$/min., within which the flow rate of nitrogen gas may be suitably varied to freely control the degree of the deoxidation of containers. However, the range is not limitative, and it is possible to overstep it, especially above the range with no problem.

The containers 6 as fully filled with nitrogen gas are then filled with a hot drink through the filler 4 via the star wheel 3, and thereafter the head space of the thus-filled containers is substituted with nitrogen gas. After this, the containers are seamed.

In this case, the head space of the filler may be filled with nitrogen gas under pressure, whereby the deoxidation of the containers may be effected more completely.

Not only the tunnel but also the whole apparatus may have an inert gas atmosphere. If so, cold filling is possible. Therefore, the present invention can be applied widely to not only the filling of containers with hot drinks such as coffee, tea, soup, shiruko (adzuki-bean soup), etc. but also the filling of containers with cold drinks such as fruit juice, vegetable juice, various supplement drinks, dressing, etc.

The drinks as referred to herein indicate all liquid, pasty and semi-solid, drinkable substances, including even those containing drinkable small solids. Examples are as follows:
(1) Milk drinks:
Milk, processed milk, long-life milk, milk-containing drinks, fermented milk, lactobacilli-containing drinks, condensed milk, etc.

(2) Soft drinks:
Coffee, tea, green tea, mugicha (infusion of parched barley), oolong, fruit juice, vegetable juice, herb tea, cocoa, soy milk, shiruko, amazake (sweet drink made from fermented rice), vitamins-added supplement drinks, nutritious drinks, etc.
(3) Others:
Soup, is miso soup, suimono (Japanese clear soup), dressing, edible oil, liquid seasoning, broth, rice gruel with or without ingredients in, peroral liquid medicine, liquid medicine for transfusion, etc.

To carry out the present invention, any of the above-mentioned drink products is sufficiently deoxidated and/or the entire process starting from raw materials to give such drink products is conducted in a deoxidated atmosphere or in an inert gas atmosphere, and thereafter the intended drink product is filled into empty containers of which the inside has been kept in a deoxidated condition.

For example, coffee powder or tea leaves are brewed and extracted with deoxidated water, warm water, hot water, boiling water or steam in an inert gas atmosphere, and the resulting coffee or tea extract is filled into deoxidated containers such as those mentioned hereinabove, whereby extremely high-quality drinks filled in containers can be produced.

After the coffee or tea extract has been filled into containers, the head space of each container may be further filled with nitrogen gas optionally under pressure, and/or the entire process starting from the preparation of raw materials to the filling of drinks into containers, and seaming and sealing the containers may be conducted in an inert gas atmosphere to obtain better results.

To carry out the oxygen-free brewing and extraction in the manner as mentioned above, for example, the atmosphere where coffee powder or tea leaves are present is substituted with an inert gas, such as nitrogen gas, thereby making it in a substantially oxygen-free condition, and, in addition, water, warm water, hot water, boiling water or steam to be used for brewing and extracting coffee powder or tea leaves is previously deoxidated, for example, using a deoxidating apparatus, thereby making it substantially free from oxygen and thereafter the thus-deoxidated water, warm water, hot water, boiling water or steam is further heated optionally under pressure and then used for brewing and extracting coffee powder or tea leaves.

Where sugar, milk, cream and others are added to the thus-prepared coffee or tea, they may also be deoxidated to obtain better results.

According to the method of the present invention, the brewing and extraction can be conducted substantially in an oxygen-free condition, in which the dissolution of ingredients that worsen the taste of the extract, such as those that make the extract acrid, too much bitter and rough, in the resulting extract can be minimized as much as possible to give high-quality coffee having a suitably bitter and mild taste and a fresh aroma.

In general, in order to increase the yield of coffee extract by increasing the amount of the solid coffee to be and extracted, the extracting temperature is kept high at from 70 to 130° C. and the extracting time is prolonged to from 20 to 120 minutes. However, such high extracting temperatures and such long extracting time worsen the taste of the resulting coffee extract. That is, ingredients with acrid, too much bitter and rough tastes are extracted in large quantities into the coffee extract under such conditions.

If, however, coffee powder is brewed and extracted in a substantially oxygen-free condition even with warm water, hot water or steam at about from 70 to 130° C., ingredients with acrid, too much bitter and rough tastes are not almost extracted out and high-quality coffee can be obtained at high yields.

In order to brew and extract coffee powder, tea leaves, etc. in an inert gas atmosphere or to produce them in an inert gas atmosphere, according to the present invention, the brewing and extracting apparatus to be used or the producing apparatus to be used are first entirely closed under certain conditions and once evacuated, and thereafter they are filled with nitrogen gas to make them in a substantially oxygen-free, inert gas atmosphere.

Water to be used for the brewing and extraction according to the present invention must be previously deoxidated to make it substantially free from oxygen. To deoxidate water, any commercially-available deoxidating apparatus can be used.

Coffee powder to be used in the present invention may be either rough or fine, which, however, must be fully deoxidated prior to being brewed and extracted.

Deoxidated water is as such or heated to be water, warm water, hot water, boiling water or steam falling between 0° C. and 130° C. and added to coffee powder to brew and extract it. For water falling between 0° C. and 40° C., it is recommended that the extracting time is between 30 minutes and 24 hours or so and that the brewing and extraction is conducted through circulation. For warm water falling between 40° C. and 70° C., the brewing and extraction may be conducted for from 20 to 120 minutes or so optionally through circulation. For hot water, boiling water, hot pressure water or steam falling between 70° C. and 130° C., the brewing and extraction may well be conducted for from 10 to 60 minutes or so.

As mentioned hereinabove, the preparation of raw materials and also the brewing and extraction thereof are conducted in an inert gas atmosphere which may be prepared by substituting oxygen with an inert gas such as nitrogen gas or the like, whereby high-quality coffee can be obtained. The high-quality coffee thus produced is filled into oxygen-free containers such as those mentioned above, then the head space of each container is substituted with an inert gas, and thereafter the containers are seamed and sealed in an inert gas atmosphere. As a result of the process, obtained are coffee products filled in containers substantially free from oxygen.

Coffee obtained according to the present invention is of high quality and has a mild bitter taste and a fresh aroma, and the high quality of coffee is maintained for a long period of time. In addition, if heated or cooled to be drunk, the high-quality coffee is not changed at all and is extremely good.

Coffee as referred to herein includes not only ordinary coffee but also any and every coffee drink with milk, cream, sweeteners such as sugar, etc., and other ingredients in.

As mentioned hereinabove, not only the process of filling various drinks into containers but also the process of preparing of them may be conducted all in a deoxidated condition to further augment the effect of the present invention.

Also as mentioned hereinabove, the preparation of raw materials and also the brewing and extraction thereof are conducted in an inert atmosphere which may be prepared by substituting oxygen with an inert gas such as nitrogen gas or the like, whereby high-quality drinks can be obtained. The high-quality drinks thus produced are filled into oxygen-free containers such as those mentioned above, then the head space of each container is substituted with an inert gas, and thereafter the containers are seamed and sealed in an inert gas atmosphere. As a result of the process, obtained are drinks filled in containers substantially free from oxygen.

Needless-to-say, drink products that have been fully deoxidated can be filled into oxygen-free containers, which are then processed in the same manner as above to obtain drinks filled in containers substantially free from oxygen.

For example, tea obtained according to the present invention has fresh taste and quality. For juices filled into containers according to the present invention, they can be stored at room temperature for a long period of time with neither change in their taste and aroma nor change in their outward appearance and color and, in addition, the reduction in the useful components such as vitamin C and others in them is retarded. For nectar and the like as filled into containers according to the present invention, their fresh quality just after the squeezing and production is maintained for a long period of time with no change in their viscosity and feel in the mouth.

Also for other drinks as filled into containers according to the present invention, their fresh quality just after their production is maintained even after having been stored for a long period of time. Thus, the drinks as filled into deoxidated containers according to the present invention fully exhibit the effect resulting from the use of the deoxidated containers.

Containers for drinks to be used in the present invention may be made from any oxygen-impermeable material and include all hard containers such as cans, bottles, aluminum or hard paper containers, containers made of aluminum or paper-laminated materials, etc.

Next, experimental example and examples of the present invention are mentioned below.

EXPERIMENTAL EXAMPLE 1

Using the apparatus illustrated herein, steel cans capable of housing 190 g of coffee each were filled with water under any of the following nitrogen gas flow conditions and then seamed.

Nitrogen Gas Flow Conditions (1) With no gas flow:

Without using a nitrogen gas atmosphere, cans were filled with water in open.

(2) Removal of oxygen from empty cans:

While introducing nitrogen gas into the tunnel, nitrogen gas was jetted into empty cans through the nozzles.

(3) Removal of oxygen from empty cans+introduction of nitrogen gas into filler head:

Nitrogen gas was jetted into empty cans through the nozzles in the same manner as above (flow rate: 1.5 N m$^3$/min.) and also into the head of the filler.

After having been seamed, the cans were left at room temperature for 1 month, and the oxygen amount in each can was measured using oxygen amount measuring devices (oxygen concentration meter: Oxygen Analyzer Model RO-101 (Iijima Products M.F.G. Co.), dissolved oxygen meter: Model DDC-10 (Denki Kagaku Keiki Co.)). The results obtained are shown in Table 1 below. The oxygen amount indicates the sum of the dissolved oxygen amount in water in each can and the oxygen amount in the head space of each can.

TABLE 1

| Nitrogen Gas Flow Condition | Oxygen Amount in Can (ml/can) |
|---|---|
| (1) With no gas flow | 0.40 |
| (2) Removal of oxygen from empty cans | |
| gas flow rate: 2.0 N m³/min. | 0.24 |
| :1.5 | 0.23 |
| (3) Removal of oxygen from empty cans (flow rate: 1.5 N m³/min.) + Introduction of nitrogen gas into filler head | |
| gas flow rate: 0.1 N m³/min. | 0.16 |
| :0.2 | 0.13 |

Number of cans tested: 190
Liquid filled into cans: water
Oxygen amount in each can: dissolved oxygen amount in water + oxygen amount in head space As is obvious from the above-mentioned results, the oxygen amount in water in each can was drastically decreased by previously making each empty substantially free from oxygen and, in addition, the oxygen amount was much more drastically decreased by filling the head space of the filler with nitrogen gas. Thus, these results verify the effectiveness of the method of the present invention.

EXAMPLE 1

A coffee making apparatus was entirely closed all the way from the brewing and extracting device to the filling device under certain conditions, into which nitrogen gas was introduced. During making coffee with this, the apparatus was kept under nitrogen gas pressure, and coffee powder was charged into the brewing and extracting device.

On the other hand, water was processed in a deoxidating apparatus to make it substantially free from oxygen, and this was passed through a heating plate to give hot pressure water at 110° C. This was poured onto the coffee powder as charged in the apparatus to obtain a coffee extract. The extract was mixed with sugar, milk components, etc. and then housed in a filler. The coffee powder, sugar, milk components and others used herein were all deoxidated through substitution with nitrogen.

Using the apparatus illustrated herein, empty 190-g cans were put into the tunnel having a nitrogen gas atmosphere therethrough, and nitrogen gas was jetted into each can through the nozzles (these were longer than those illustrated in the drawings to reach nearly the bottom of each can) at a flow rate of 1.0 N m³/min. whereby oxygen was removed from each empty can.

The coffee mixture prepared as above was poured into each can through the filler, then the head space of each can was filled with nitrogen gas, and the cans were seamed and sealed to give canned coffee. The head space of the filler was also deoxidated by introducing nitrogen gas thereinto at a flow rate of 0.05 N m³/min. The canned coffee was referred to as Sample 2.

As a control, only the step of jetting nitrogen gas into empty cans through the nozzles was omitted (that is, empty cans were directly passed through the tunnel having a nitrogen gas atmosphere therethrough without jetting nitrogen gas into the cans), but otherwise the same process as above was repeated to give canned coffee. The canned coffee was referred to as Sample 1.

Sample 2 and Sample 1 were left at room temperature for 3 months, then opened and subjected to a panel test where 30 panelists tried and evaluated them against points 1 to 5.

The results are shown in Table 2 below.

TABLE 2

| Sample | Evaluation of Taste | | | | | |
|---|---|---|---|---|---|---|
| | 5 | 4 | 3 | 2 | 1 | |
| 1 | 6 | 7 | 10 | 6 | 1 | Too much bitter |
| 2 | 15 | 12 | 2 | 1 | 0 | Mild and easy to drink |

Though having been stored for a long period of time, Sample 2 maintained a sharp taste intrinsic to coffee. The panelists evaluated that Sample 2 is good as being free from any unpleasant acrid and acidic taste and having a fresh aroma.

As is obvious from the above-mentioned results, canned coffee as produced according to the present invention was significantly prevented from being deteriorated, and it was not too much bitter but mild. Even after having been stored for 3 months, it still maintained its fresh aroma. These results verify that the deoxidation of empty cans according to the present invention is extremely effective.

EXAMPLE 2

A tea making apparatus was entirely closed all the way from the brewing and extracting device to the filling device under certain conditions, into which nitrogen gas was introduced. During making tea with this, the apparatus was kept under nitrogen gas pressure, and tea leaves were charged into the brewing and extracting device.

On the other hand, water was processed in a deoxidating apparatus to make it substantially free from oxygen, and this was passed through a heating plate to give hot water at 85° C. This was poured onto the tea leaves as charged in the apparatus to obtain a tea extract. The extract was mixed with sugar, milk components, etc. and then housed in a filler. The tea leaves, sugar, milk components and others used herein were all deoxidated through substitution with nitrogen.

Using the apparatus illustrated herein, empty 190-g cans were put into the tunnel having a nitrogen gas atmosphere therethrough, and nitrogen gas was jetted into each can through the nozzles (these were longer than those illustrated in the drawings to reach nearly the bottom of each can) at a flow rate of 1.0 N m³/min. whereby oxygen was removed from each empty can.

The milk tea prepared as above was poured into each can through the filler, then the head space of each can was filled with nitrogen gas, and the cans were seamed and sealed to give canned milk tea. The head space of the filler was also deoxidated by introducing nitrogen gas thereinto at a flow rate of 0.05 N m³/min. The canned milk tea was referred to as Sample 2.

As a control, only the step of jetting nitrogen gas into empty cans through the nozzles was omitted (that is, empty cans were directly passed through the tunnel having a nitrogen gas atmosphere therethrough without jetting nitrogen gas into the cans), but otherwise the same process as above was repeated to give canned milk tea. The canned milk tea was referred to as Sample 1.

Sample 2 and Sample 1 were left at room temperature for 3 months, then opened and subjected to a panel test where 30 panelists tried and evaluated them against points 1 to 5.

The results are shown in Table 3 below.

TABLE 3

| Sample | Evaluation of Taste | | | | | |
|---|---|---|---|---|---|---|
| | 5 | 4 | 3 | 2 | 1 | |
| 1 | 6 | 7 | 10 | 6 | 1 | Too much rough |
| 2 | 15 | 12 | 2 | 1 | 0 | Mild and easy to drink |

Though having been stored for a long period of time, Sample 2 maintained a mild and calmative taste peculiar to milk tea. The panelists evaluated that Sample 2 is good as being free from any unpleasant acrid and too much rough taste and having a fresh aroma.

As is obvious from the above-mentioned results, canned milk tea as produced according to the present invention was significantly prevented from being deteriorated, and it was mild and suitably astringent. Even after having been stored for 3 months, it still maintained its fresh aroma. These results verify that the deoxidation of empty cans according to the present invention is extremely effective.

EXAMPLE 3

Grapefruits grown in Florida in North America were processed in a deoxidated condition all the way from being squeezed to toned and thereafter processed in the same manner as in Example 1 to prepare grapefruit juice as filled in oxygen-free cans. As a control, canned grapefruit juice that had not been deoxidated was prepared. These were left at room temperature for 3 months and then subjected to organoleptic evaluation where 20 panelists skilled in the art tested the samples with respect to the taste and aroma.

For the organoleptic evaluation, the quality of the samples was evaluated on the basis of the total points according to the following criteria. The results of the organoleptic evaluation are shown in Table 3 below.

The taste and aroma was extremely good: 2 points

The taste and aroma was good: 1 point

The taste and aroma was not good: 0 point

TABLE 4

| Panel Test for Grapefruit Juice | |
|---|---|
| Grapefruit | Points |
| Control Sample | 11 |
| Sample of the Invention | 30 |

As is obvious from the results mentioned above, it has been verified that the sample of the present invention (fully deoxidated grapefruit juice) is superior to the control sample. The reason why the panelists said that the sample of the present invention is good is because it is not bitter, its acid taste has been moderated and is mild and it is fresh.

Advantages of the Invention

According to the present invention which employs the novel constitution of deoxidating the inside of empty containers, the drastic antioxidation of empty containers, prior to being filled with drinks, has become possible for the first time. As a result, it has become possible for the first time to produce extremely high-quality drinks as filled in containers, which, however, was impossible in the prior art process using inert gas.

The quality of the canned drinks as produced according to the present invention is extremely high and is not comparable at all to the quality of the conventional canned drinks. Even when stored for a long period of time, the canned drinks of the present invention can still maintain their fresh taste as if the drinks were just brewed, squeezed or made. In addition, the period within which the drinks can be safely drunk can be prolonged. Thus, the present invention is really an epoch-making one.

What is claimed is:

1. A method for producing high-quality coffee or tea drinks filled in sterilized containers, which comprises:

deoxidating coffee or tea leaves, followed by extraction and brewing said coffee or tea leaves in a substantially oxygen free inert gas atmosphere with one deoxidated extracting and brewing agent selected from the group consisting of ambient temperature water, warm water, hot water, boiling water and steam to obtain a brewed coffee or tea drink;

adding to said brewed drink in substantially oxygen free inert gas atmosphere at least one member selected from the group consisting of deoxidated sugar, deoxidated milk, and deoxidated cream to provide a substantially oxygen-free drink;

flushing a container adapted to receive said drink with inert gas to remove oxygen from said container to provide a substantially oxygen-free container;

filling, in a substantially oxygen-free inert gas atmosphere, the substantially oxygen-free container with the substantially oxygen-free drink from a filler in which the head space is filled with inert gas under pressure in a substantially deoxidated atmosphere, the resulting container having head space containing a substantially oxygen-free inert gas atmosphere; and sealing the container.

2. The method according to claim 1, wherein prior to filling said container with said drink, said container is deoxidated by flushing with said inert gas at a flow rate of 0.01 to 5 gas $m^3$/min.

3. The method according to claim 1, wherein said extracting and brewing is carried out in the temperature range of 70° C. to 130° C. for 10 minutes to 60 minutes.

4. The method according to claim 1, wherein the tea leaves are tea leaves of at least one member selected from the group consisting of green tea, oolong tea, black tea, and herb tea.

5. The method according to claim 1, wherein the inert gas is nitrogen gas.

6. A high quality drink filled in a container, produced according to the method of claim 1.

7. A high-quality drink filled in a container, produced according to the method of claim 2.

8. A high-quality drink filled in a container, produced according to the method of claim 3.

9. A high-quality drink filled in a container, produced according to the method of claim 4.

10. A high-quality drink filled in a container, produced according to the method of claim 5.

* * * * *